(12) United States Patent
Balepin

(10) Patent No.: US 8,381,508 B2
(45) Date of Patent: Feb. 26, 2013

(54) CLOSED-CYCLE ROCKET ENGINE ASSEMBLIES AND METHODS OF OPERATING SUCH ROCKET ENGINE ASSEMBLIES

(75) Inventor: Vladimir V. Balepin, Manorville, NY (US)

(73) Assignee: Alliant Techsystems Inc., Arlington, VA (US)

( * ) Notice: Subject to any disclaimer, the term of this patent is extended or adjusted under 35 U.S.C. 154(b) by 933 days.

(21) Appl. No.: 12/473,383

(22) Filed: May 28, 2009

(65) Prior Publication Data
US 2010/0300065 A1 Dec. 2, 2010

(51) Int. Cl.
*B63H 11/00* (2006.01)

(52) U.S. Cl. ............................................ 60/204; 60/266

(58) Field of Classification Search .................... 60/257, 60/259, 260, 266, 204, 728; 239/127.1, 127.3
See application file for complete search history.

(56) References Cited

U.S. PATENT DOCUMENTS

| | | | | |
|---|---|---|---|---|
| 3,516,254 A | * | 6/1970 | Hammond | 60/260 |
| 4,912,925 A | * | 4/1990 | Foust | 60/259 |
| 5,410,874 A | * | 5/1995 | Limerick | 60/267 |
| 5,918,460 A | * | 7/1999 | Connell et al. | 60/257 |
| 6,470,670 B2 | | 10/2002 | Maeding | |
| 6,655,127 B2 | | 12/2003 | Kruse et al. | |
| 6,769,242 B1 | | 8/2004 | Balepin | |
| 7,216,477 B1 | | 5/2007 | Erickson et al. | |
| 7,334,396 B2 | | 2/2008 | Erickson et al. | |
| 7,784,268 B1 | * | 8/2010 | Greason et al. | 60/259 |
| 7,784,269 B1 | * | 8/2010 | Greason et al. | 60/260 |

OTHER PUBLICATIONS

Balepin, Vladimir, "Concept of the Third Fluid Cooled Liquid Rocket Engine," AIAA-2006-4695, 11 pages (no date).

\* cited by examiner

*Primary Examiner* — Phutthiwat Wongwian
(74) *Attorney, Agent, or Firm* — TraskBritt

(57) ABSTRACT

Closed-cycle rocket engine assemblies including a combustor assembly, a combustor jacket, a turbine, a first pump and a mixing chamber are disclosed. The combustor jacket facilitates the transfer of heat from the combustor assembly into a fluid and the turbine is driven by a heated fluid from the combustor jacket. The mixing chamber may include a first inlet to receive a fluid from the turbine, a second inlet to receive a fluid from a first reactant reservoir, and an outlet to deliver a fluid to the first pump. Additionally, the first pump may be coupled to and powered by the turbine and the first pump may be configured to deliver at least a portion of the fluid from the mixing chamber into the combustion chamber of the combustor assembly. Related methods of operating such rocket engine assemblies are also disclosed.

20 Claims, 2 Drawing Sheets

CLOSED-CYCLE ROCKET ENGINE ASSEMBLIES AND METHODS OF OPERATING SUCH ROCKET ENGINE ASSEMBLIES

TECHNICAL FIELD

The invention relates to rocket engines. In particular, embodiments of the invention relate to closed-cycle rocket engine assemblies and to methods of operating such rocket engine assemblies.

BACKGROUND

Liquid propellants may be desirable as propellant, or fuel and oxidizer sources for rocket engines, as liquids have a relatively high density that may allow the volume of the tanks to be relatively small, which may result in a relatively high mass ratio. Additionally, rocket engines utilizing liquid propellants may be configured to be fueled immediately prior to launch, launched, recovered and then later refueled and reused.

Liquid fueled rocket engines may be generally categorized as open-cycle engines or closed-cycle engines. An open-cycle engine may utilize a gas-generator. The gas generator burns propellant to generate a hot gas to drive a turbine that is used to power the engine's pumps. The gases from the gas generator are then exhausted, separately from a nozzle of the engine, thus the use of the term "open-cycle." The separate discharge of exhaust gases generated by the pre-burner results in impulse losses to the rocket.

In closed-cycle engines, such as staged combustion cycle engines, all of the propellant gases may be expelled through a nozzle of the engine, which may result in a more efficient engine. However, staged combustion cycle engines still require a pre-burner to generate hot gases to drive a turbine to power the engine's pumps. This may result in a relatively complex engine design, relatively harsh operating conditions for the turbine and may require specialized plumbing to carry the hot gases through the system. Additionally, a staged combustion power cycle may result in unnecessary pressure build-up, which results in system inefficiencies. For example, a staged combustion rocket engine assembly may have a pump discharge to combustion chamber pressure ratio between 2.5 and 3.

Expander cycle engines heat liquid fuel to form a vaporized fuel that is utilized to drive a turbine to power the engine's pumps. In view of this approach, expander cycle engines do not require a gas generator or pre-burner. However, conventional closed-cycle expander engines, which direct all of the fuel through the turbine and then into a combustion chamber of the engine, require a pump discharge to combustion chamber pressure ratio between 2.5 and 3. This additional pressure build-up requires relatively high turbine power and turbine inlet pressure. These factors lead to weight increase and lower reliability. Open-cycle expander engines, which only heat some of the fuel to drive a turbine and then discharge the heated fuel to improve turbine efficiency, may not require the mentioned pressure build-up and related implications compared to a conventional closed-cycle expander cycle engine. However, the discharging of a portion of the fuel results in efficiency losses.

In view of the foregoing, improved rocket engine assemblies, rocket engine power cycles and methods of operating rocket engines would be desirable.

BRIEF SUMMARY

In some embodiments, a closed-cycle rocket engine assembly may include a combustor assembly, a combustor jacket, a turbine, a first pump and a mixing chamber. The combustor assembly may include a combustion chamber and a nozzle, and the combustor jacket may be positioned and configured to facilitate the transfer of heat from the combustor assembly into a fluid. The turbine may be in communication with the combustor jacket to receive fluid heated by the combustor jacket to drive the turbine. The mixing chamber may include a first inlet configured to receive a fluid from the turbine, a second inlet configured to receive a fluid from a first reactant reservoir, and an outlet configured to deliver a fluid to the first pump. Additionally, the first pump may be configured to deliver combined fluid from the mixing chamber into the combustion chamber of the combustor assembly.

In additional embodiments, a method of operating a closed-cycle rocket engine assembly may include driving a turbine with a first fluid to operate a first pump coupled to the turbine and directing the first fluid from the turbine into a mixing chamber. Additionally, the method may include directing a second fluid from a reactant reservoir into the mixing chamber, directing a combined fluid comprising the first and second fluids from the mixing chamber into the first pump, and delivering at least a portion of the combined fluid from the first pump into a combustion chamber of a combustor assembly.

DETAILED DESCRIPTION

The illustrations presented herein are not meant to be actual views of any particular device or system, but are merely idealized representations that are employed to describe various embodiments of the present invention. It is noted that elements that are common between figures may retain the same numerical designation.

Figure 1:
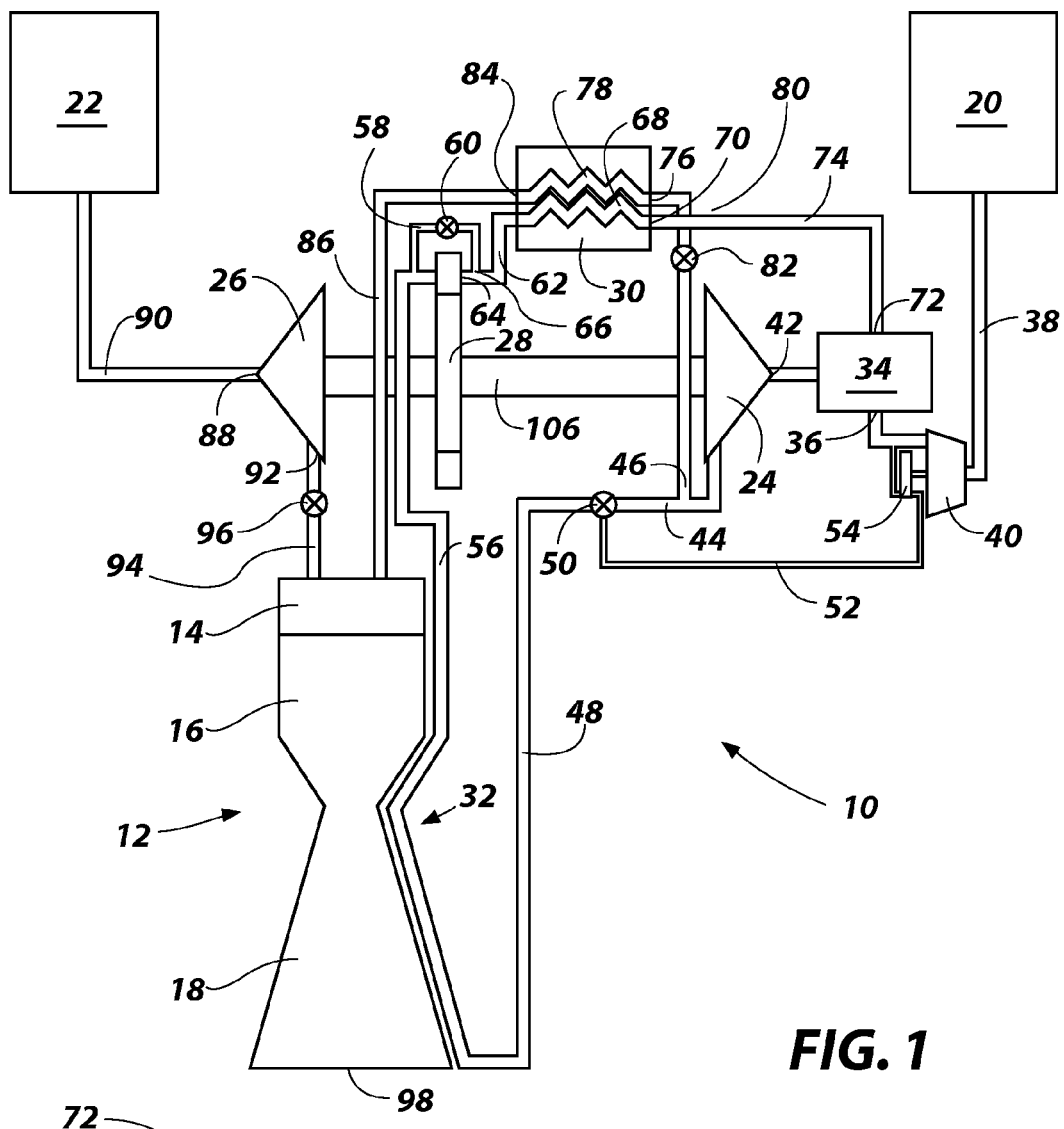
FIG. 1 shows a schematic representation of a closed-cycle rocket engine assembly according to an embodiment of the present invention.

In some embodiments, such as is shown in FIG. 1, a closed-cycle rocket engine assembly 10 may include a combustor assembly 12 having an injector 14, a combustion chamber 16 and a nozzle 18. The rocket engine assembly 10 may also include reactant reservoirs, such as a fuel reservoir 20 and an oxidizer reservoir 22, reactant pumps, such as a main fuel pump 24 and a main oxidizer pump 26, and one or more turbines coupled to the reactant pumps 24, 26, such as a main turbine 28. Additionally, the rocket engine assembly 10 may include one or more heat exchangers, such as a heat exchanger 30 and a combustor jacket 32, a mixing chamber 34 and fluid conduits to direct fluid between components of the rocket engine assembly 10.

The fuel reservoir 20 may be coupled to a first inlet 36 of the mixing chamber 34 by a fluid conduit 38, and optionally, the fluid conduit 38 may include a boost pump 40, which may be utilized to direct fuel into the mixing chamber 34. The mixing chamber 34 may be coupled to an inlet 42 of the main fuel pump 24 and the main fuel pump 24 may include an outlet conduit that may include a first outlet 44 and a second outlet 46. The first outlet 44 may be coupled to an inlet of the combustor jacket 32 by a conduit 48, which may optionally include a valve 50 coupled to a second conduit 52 that may be utilized to direct fluid to a boost turbine 54 coupled to the boost pump 40. In view of this arrangement, the valve 50 may be configured to control and direct fluid flow through each conduit 48, 52. The combustor jacket 32 may include one or more fluid channels located proximate the combustion chamber 16 and nozzle 18 of the combustor assembly 12 and the outlet of the combustor jacket 32 may be coupled to a conduit 56 that may be utilized to direct heated fluid from the combustor jacket 32 into the main turbine 28. Additionally, a bypass conduit 58 including a control valve 60 may be coupled to the conduit 56 and may be configured to control the amount of heated fluid to be directed through the main turbine 28 by controlling the amount of heated fluid that may bypass the turbine 28 through the bypass conduit 58.

The main turbine 28 may be mechanically coupled to the main fuel pump 24 and the main oxidizer pump 26. Consequently, the heat energy transferred to the fluid within the combustor jacket 32 may be utilized to drive the main turbine 28 and power each of the main fuel pump 24 and the main oxidizer pump 26.

A conduit 62 may extend from an outlet 64 of the main turbine 28, and may be coupled to an outlet 66 of the bypass conduit 58, to direct fluid from the main turbine 28 and bypass conduit 58 into a first channel 68 of the heat exchanger 30. An outlet 70 of the first channel 68 of the heat exchanger 30 may be coupled to a second inlet 72 of the mixing chamber 34 by a conduit 74 that may be utilized to direct fluid from the first channel 68 of the heat exchanger 30 into the mixing chamber 34 through the second inlet 72. Thus, fluid which has passed through the combustor jacket 32 and the first channel 68 of the heat exchanger 30 and fluid from the fuel reservoir 20 may be mixed in the mixing chamber 34. As previously discussed, the mixing chamber 34 may be coupled to the inlet 42 of the main fuel pump 24 to direct fuel within the mixing chamber 34 into the main fuel pump 24, and the fuel may exit the main fuel pump 24 through the outlet conduit and then the first and second outlets 44, 46, respectively. A portion of the fuel that is directed through the first outlet 44 may be directed through the combustor jacket 32 and the first channel 68 of the heat exchanger 30 and returned to the mixing chamber 34.

The second outlet 46 of the outlet conduit of the main fuel pump 24 may be coupled to an inlet 76 to a second channel 78 of the heat exchanger 30 by a fluid conduit 80 that may include a control valve 82, which may be utilized to meter the amount of fuel that is directed into the second channel 78 of the heat exchanger 30 by the main fuel pump 24. The first and second channels 68, 78 of the heat exchanger 30 may be positioned and configured to facilitate the transfer of heat from fuel directed through the first channel 68 to fuel directed through the second channel 78. An outlet 84 of the second channel 78 of the heat exchanger 30 may be coupled to the injector 14 of the combustor assembly 12 by a fluid conduit 86 that may be utilized to direct the fuel from the second channel 78 of the heat exchanger 30 into the injector 14 of the combustor assembly 12.

The oxidizer reservoir 22 may be coupled to an inlet 88 of the main oxidizer pump 26 by a conduit 90 configured to deliver an oxidizer from the oxidizer reservoir 22 to the inlet 88 of the main oxidizer pump 26. Optionally, the conduit 90 may also include a boost pump (not shown), which may facilitate the transfer of oxidizer from the oxidizer reservoir 22 to the main oxidizer pump 26. The outlet 92 of the main oxidizer pump 26 may be coupled to the injector 14 of the combustor assembly 12 by a conduit 94 that may include a control valve 96, which may be utilized to control the amount of oxidizer that may be delivered into the injector 14 of the combustor assembly 12.

The injector 14 may be configured to mix the fuel and the oxidizer and deliver the mixed reactants to the combustion chamber 16, where the reactants may be ignited and combust to form propellant gases. The nozzle 18 may be coupled to the combustion chamber 16 and may be utilized to direct the combustion gases out of the combustor assembly 12 through an opening 98 at an end of the nozzle 18 to generate thrust, such as to propel a vehicle.

In further detail, the fuel reservoir 20 may comprise a pressure vessel for holding a quantity of pressurized fuel. For example, a cryogenic liquid fuel (i.e., liquid methane or liquid hydrogen) may be stored in the fuel reservoir 20. The fuel may be maintained in a liquid phase as it is directed from the fuel reservoir 20 into the first inlet 36 of the mixing chamber 34.

Figure 2:
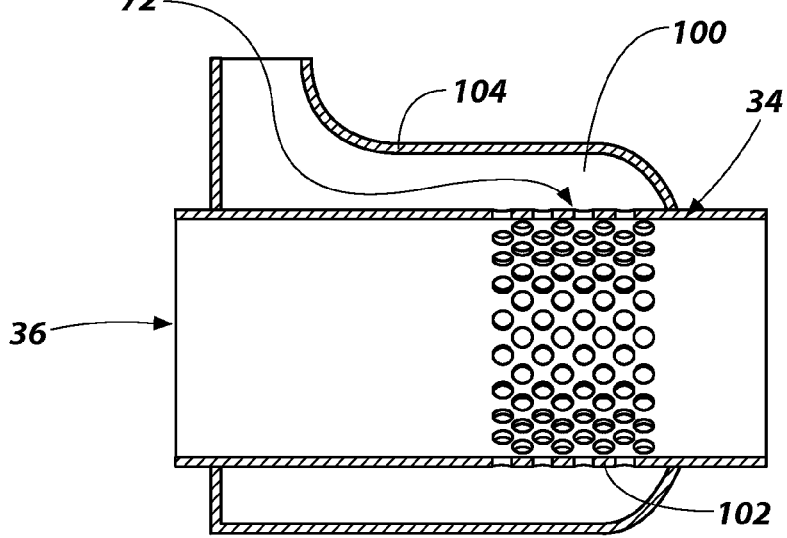
FIG. 2 shows a perspective cross-sectional view of an embodiment of a mixing chamber for a closed-cycle rocket engine assembly, such as is shown in FIG. 1.

In some embodiments, such as shown in FIG. 2, and with continued reference to FIG. 1, the mixing chamber 34 may comprise a porous structure separating a first chamber 100 from the mixing chamber 34. For example, the mixing chamber 34 may be generally configured as a perforated tube 102 positioned within an outer housing 104. The first chamber 100 may be a generally annular chamber defined by an outer wall of the perforated tube 102 and an inner wall of the outer housing 104. The first inlet 36 may be utilized to direct the fuel into the mixing chamber 34 from the fuel reservoir 20 through an opening at an end of the perforated tube 102. The second inlet 72 may be utilized to direct fuel from the heat exchanger 30 into the mixing chamber 34 through a perforated wall of the perforated tube 102. In view of this, fuel that is directed from the heat exchanger 30, which may be relatively warm in comparison to the liquid fuel from the fuel reservoir 20, may be well mixed with the liquid fuel from the fuel reservoir 20 prior to exiting the mixing chamber 34, as such mixing may prevent gas pockets from forming within the mixing chamber 34 and, thus, prevent cavitation within the main pump 24.

The liquid fuel within the mixing chamber 34 may be directed through the main fuel pump 24 and a portion of the liquid fuel may be directed through the first outlet 44 of the outlet conduit and delivered to the combustor jacket 32. The combustor jacket 32 may surround components of the combustor assembly 12, such as the combustion chamber 16 and the nozzle 18. The combustor jacket 32 may include fluid channels that may be utilized to distribute a fluid flow throughout the combustor jacket 32 and facilitate the transfer of heat from the combustion chamber 16 and the nozzle 18 of the combustor assembly 12. In view of this arrangement, the combustor jacket 32 may be utilized to extract sufficient heat from the combustor assembly 12 to prevent the overheating and damage of components of the combustor assembly 12, such as the combustion chamber 16 and the nozzle 18. As heat is transferred from the combustor assembly 12 to the fuel within the combustor jacket 32, the fuel is caused to transition from a liquid phase to a gaseous phase, and the gaseous fuel is directed to the main turbine 28.

The heated, gaseous fuel may be directed through the main turbine 28 and the energy stored in the gaseous fuel as heat and pressure may be at least partially converted to kinetic energy imparted to the main turbine 28. As the fuel is directed through and exits the main turbine 28, the fuel cools and the pressure of the fuel is lowered.

As previously discussed, the main turbine 28 may be coupled to the main fuel pump 24 and the main oxidizer pump 26 and may be utilized to drive the main fuel pump 24 and main oxidizer pump 26. For example, the main turbine 28, the main fuel pump 24 and the main oxidizer pump 26 may share a single central shaft 106 to directly, rotationally couple the main turbine 28, the main fuel pump 24 and the main oxidizer pump 26. In additional embodiments, the main turbine 28 may be coupled to one or more of the main fuel pump 24 and the main oxidizer pump 26 with a transmission, such as a gear box (not shown), that may be utilized to transfer power from the main turbine 28 to the main fuel pump 24 and the main oxidizer pump 26. In additional embodiments, each of the main pumps 24, 26 may have a separate turbine operated by the same fluid in parallel-flow or in series-flow configurations.

The fuel that exits the main turbine 28 may then be directed through the first channel 68 of the heat exchanger 30. Additionally, liquid fuel from the second outlet 46 of the outlet conduit of the main fuel pump 24 may be directed to the second channel 78 of the heat exchanger 30. The first and second channels 68, 78 of the heat exchanger 30 may be sized and configured to facilitate the transfer of heat from the fuel entering the first channel 68 from the main turbine 28 to the cooled liquid fuel entering the second channel 78 from the second outlet 46 of the outlet conduit of the main fuel pump 24. For example, the heat exchanger 30 may be configured as one or more of a counter-flow heat exchanger, a shell and tube heat exchanger, a plate heat exchanger, and a plate fin heat exchanger. Within the first channel 68 of the heat exchanger 30, the fuel from the main turbine 28 may be cooled to a pressure and temperature relatively close to a phase-transition pressure and temperature. The fuel exiting the first channel 68 of the heat exchanger 30 may then be directed into the mixing chamber 34. Meanwhile, the liquid fuel exiting the second channel 78 of the heat exchanger 30 may be directed into the injector 14 of the combustor assembly 12. As the fuel exiting the first channel 68 of the heat exchanger 30 is directed into the mixing chamber 34 and is mixed with the fuel entering the mixing chamber 34 from the fuel reservoir 20, any remaining vaporized fuel is condensed to liquid fuel.

The oxidizer reservoir 22 may comprise a pressure vessel that may be utilized to hold a quantity of pressurized oxidizer. For example, a cryogenic liquid oxidizer (i.e., liquid oxygen) may be stored in the oxidizer reservoir 22. The oxidizer may be maintained in a liquid phase as it is directed from the oxidizer reservoir 22 into the main oxidizer pump 26 and then directed from the main oxidizer pump 26 into the injector 14 of the combustor assembly 12.

As an example of the operation of the rocket engine assembly 10, a first reactant fluid, such as a fuel (i.e., liquid methane or liquid hydrogen), and a second reactant fluid, such as an oxidizer (i.e., liquid oxygen), are simultaneously directed into the injector 14 to be mixed, then combusted in the combustion chamber 16 and then the resulting combustion gases are ejected through the nozzle 18 of the combustor assembly 12.

The first reactant fluid is directed from a first reactant fluid reservoir (i.e., the fuel reservoir 20) into the first inlet 36 of the mixing chamber 34 through the fluid conduit 38. The first reactant fluid from the mixing chamber 34 is then fed into the main fuel pump 24 and upon exiting the main fuel pump 24 is divided into two fluid streams. One of the fluid streams is directed through the fluid conduit 80, then through the second channel 78 of the heat exchanger 30, through a fluid conduit 86, and finally, the first reactant is directed into the injector 14 of the combustor assembly 12, by pressure provided by the main fuel pump 24.

The rest of the first reactant fluid is directed into the other fluid stream, which is directed through the fluid conduit 48 into the combustor jacket 32 by pressure provided by the main fuel pump 24. Heat is then transferred into the first reactant fluid within the combustor jacket 32 from the combustor assembly 12. The heated first reactant fluid is then directed through the main turbine 28, which drives the main turbine 28 and powers the main fuel pump 24 and the main oxidizer pump 26. The heated first reactant fluid is then directed through the first channel 68 of the heat exchanger 30, where heat is transferred from the fluid stream of heated first reactant fluid in the second channel 78 of the heat exchanger 30 to the fluid stream of first reactant fluid in the first channel 68 before the fluid stream of first reactant fluid in the second channel 78 is directed into the injector 14 of the combustor assembly 12. Upon exiting the first channel 68 of the heat exchanger 30, the heated first reactant fluid is directed into the second inlet 72 of the mixing chamber 34 where it is combined with the first reactant fluid entering the mixing chamber 34 from the fuel reservoir 20 through the first inlet 36 of the mixing chamber 34.

As the first reactant fluid is pumped by the main fuel pump 24 to provide the first reactant fluid to the injector 14 of the combustor assembly 12, as well as to provide the first reactant fluid to cool the combustor assembly 12 and drive the main turbine 28, the second reactant fluid is pumped by the main oxidizer pump 26 to provide the second reactant fluid to the injector 14 of the combustor assembly 12. The second reactant fluid is directed from a second reactant fluid reservoir (i.e., the oxidizer reservoir 22) into the inlet 88 of the main oxidizer pump 26 through the fluid conduit 90. The second reactant fluid is then fed through the main oxidizer pump 26 and exits the outlet 92 of the main oxidizer pump 26 where the second reactant fluid is directed into the injector 14 of the combustor assembly 12 through the fluid conduit 94.

Figure 3:
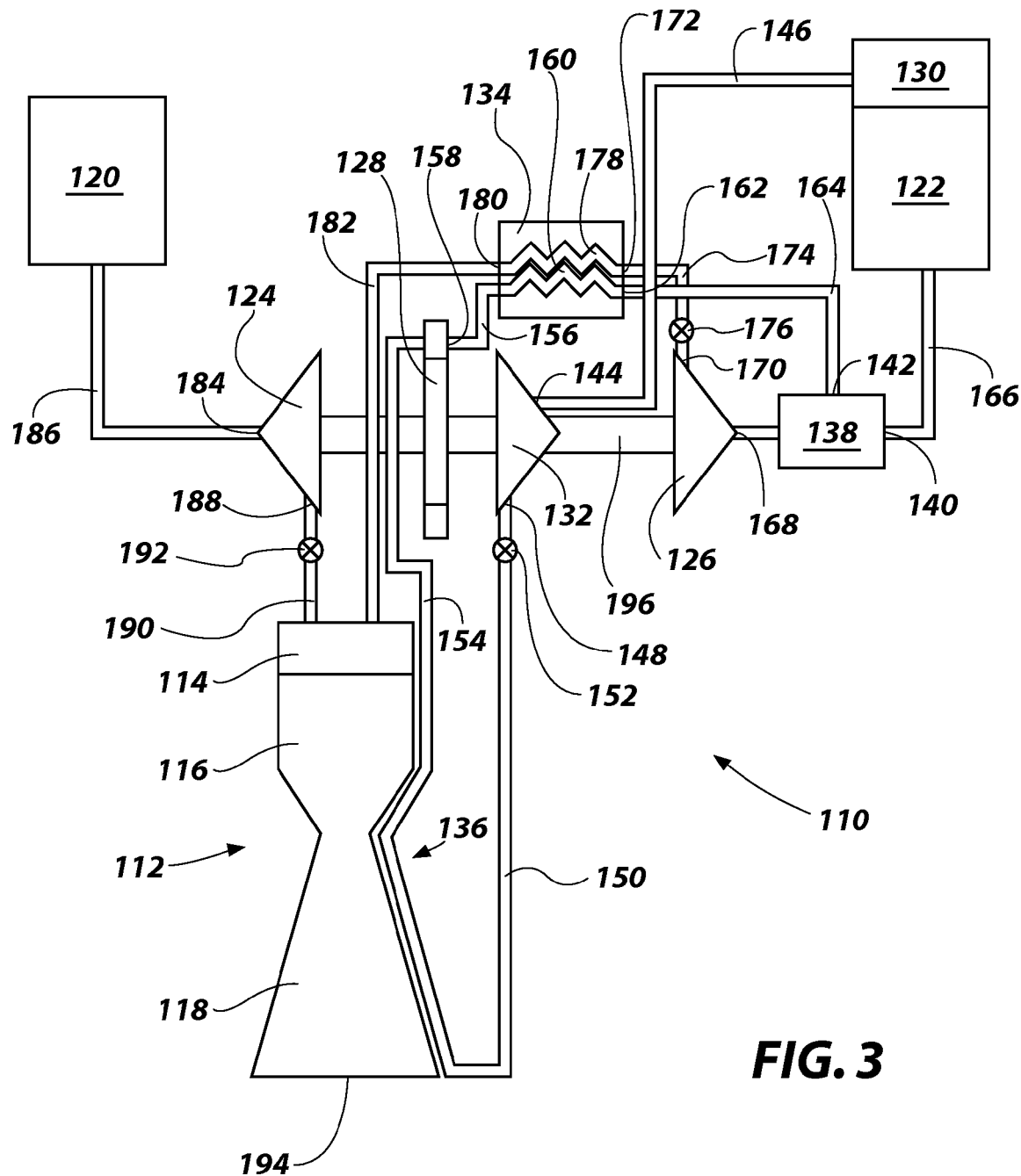
FIG. 3 shows a schematic representation of a closed-cycle rocket engine assembly including a coolant reservoir and a coolant pump, according to an embodiment of the present invention.

In additional embodiments, as shown in FIG. 3, a rocket engine assembly 110 may include a combustor assembly 112 having an injector 114, combustion chamber 116 and nozzle 118. The rocket engine assembly 110 may also include reactant reservoirs, such as a fuel reservoir 120 and an oxidizer reservoir 122, reactant pumps, such as a main fuel pump 124 and a main oxidizer pump 126, and one or more turbines coupled to the reactant pumps 124, 126, such as a main turbine 128. Additionally, the rocket engine assembly 110 may include a coolant reservoir 130, and a main coolant pump 132, which may be coupled to the main turbine 128. The rocket engine assembly 110 may include one or more heat exchangers, such as a heat exchanger 134 and a combustor jacket 136, a mixing chamber 138, having a first inlet 140 and a second inlet 142, and fluid conduits to direct fluid between components of the rocket engine assembly 110.

The coolant reservoir 130 may be coupled to an inlet 144 of the main coolant pump 132 by a conduit 146, which may optionally include a boost pump (not shown). An outlet 148 of the main coolant pump 132 may be coupled to an inlet of the combustor jacket 136 by a conduit 150 that may include a control valve 152, which may be configured to control the flow of fluid through the conduit 150. The combustor jacket 136 may include fluid channels located proximate the combustion chamber 116 and nozzle 118 of the combustor assembly 112 and an outlet of the combustor jacket 136 may be coupled to a conduit 154 that may be utilized to direct heated fluid from the combustor jacket 136 into the main turbine 128. Additionally, a bypass conduit including a control valve (not shown) may be coupled to the conduit 154 and may be configured to control the amount of heated fluid that may be directed through the main turbine 128 by controlling the amount of heated fluid that may bypass the main turbine 128 through the bypass conduit.

A conduit 156 may extend from an outlet 158 of the main turbine 128 to the heat exchanger 134, and may be utilized to direct fluid into a first channel 160 of the heat exchanger 134. An outlet 162 of the first channel 160 of the heat exchanger 134 may be coupled to the second inlet 142 of the mixing chamber 138 by a fluid conduit 164 that may be utilized to direct fluid from the first channel 160 of the heat exchanger 134 into the mixing chamber 138 through the second inlet 142.

The oxidizer reservoir 122 may be coupled to the first inlet 140 of the mixing chamber 138 by a fluid conduit 166, and optionally, the fluid conduit 166 may include a boost pump (not shown), which may be utilized to direct oxidizer into the mixing chamber 138 through the first inlet 140. In view of this arrangement, fluid from the coolant reservoir 130, which has passed through the combustor jacket 136, the main turbine 128, and the first channel 160 of the heat exchanger 134, and oxidizer from the oxidizer reservoir 122, may be mixed in the mixing chamber 138. For example, water may be provided by the coolant reservoir 130 and hydrogen peroxide may be provided by the oxidizer reservoir 122 and the water and hydrogen peroxide may be mixed in the mixing chamber 138.

The mixing chamber 138 may be coupled to an inlet 168 of the main oxidizer pump 126. An outlet 170 of the main oxidizer pump 126 may be coupled to an inlet 172 to a second channel 178 of the heat exchanger 134 by a conduit 174, which may include a control valve 176 that may be configured to meter the amount of fluid that is directed into the second channel 178 of the heat exchanger 134 by the main oxidizer pump 126. The first and second channels 160, 178 of the heat exchanger 134 may be positioned and configured to facilitate the transfer of heat from fluid directed through the first channel 160 to fluid directed through the second channel 178. An outlet 180 of the second channel 178 of the heat exchanger 134 may be coupled to the injector 114 of the combustor assembly 112 by a fluid conduit 182 that may be utilized to direct the fluid from the second channel 178 of the heat exchanger 134 into the injector 114 of the combustor assembly 112.

The fuel reservoir 120 may be coupled to the inlet 184 of the main fuel pump 124 by a fluid conduit 186 configured to deliver a fuel from the fuel reservoir 120 to the inlet 184 of the main fuel pump 124. Optionally, the fluid conduit 186 may also include a boost pump (not shown) to facilitate the transfer of fuel from the fuel reservoir 120 to the main fuel pump 124. The outlet 188 of the main fuel pump 124 may be coupled to the injector 114 of the combustor assembly 112 by a fluid conduit 190 that may include a control valve 192, which may be utilized to control the amount of fuel that may be delivered into the injector 114 of the combustor assembly 112.

The injector 114 may be configured to mix the fuel and the oxidizer and deliver the mixed reactants, along with the coolant fluid, to the combustion chamber 116 where the reactants may be ignited and combust to form propellant gases. The nozzle 118 may be coupled to the combustion chamber 116 to direct the combustion gases out of the combustor assembly 112 through an opening 194 at an end of the nozzle 118 to generate thrust, such as to propel a vehicle.

In further detail, the coolant reservoir 130 may comprise a vessel for holding a quantity of liquid coolant. For example, purified liquid water may be stored in the coolant reservoir, and may be utilized as the coolant. Optionally, the coolant reservoir 130 may be pressurized, such as by a pressurized gas. The water may be maintained in a liquid phase within the coolant reservoir 130 and as it is directed from the coolant reservoir 130 into the main coolant pump 132.

The combustor jacket 136 may surround the combustion chamber 116 and the nozzle 118 of the combustor assembly 112, and may be generally similar to the combustor jacket 32 described in reference to FIG. 1. As heat is transferred from the combustor assembly 112 to the water within the combustor jacket 136, the water may be caused to transition from a liquid phase to a gaseous phase (i.e., steam), and the steam directed to the main turbine 128.

The heated steam directed through the main turbine 128 may expand and cool, and the energy stored in the steam may be at least partially converted to kinetic energy imparted to the main turbine 128. As the steam is directed through the main turbine 128 and drives the main turbine 128, the steam may cool and its pressure lowered, approaching a saturation temperature and pressure.

The main turbine 128 may be mechanically coupled to the main fuel pump 124, the main oxidizer pump 126 and the main coolant pump 132, and utilized to drive the pumps 124, 126, 132. For example, the main turbine 128, the main fuel pump 124, the main oxidizer pump 126 and the main coolant pump 132 may share a single central shaft 196 that may directly and rotationally couple the main turbine 128, the main fuel pump 124, the main oxidizer pump 126 and the main coolant pump 132. In additional embodiments, the main turbine 128 may be coupled to one or more of the main fuel pump 124, the main oxidizer pump 126 and the main coolant pump 132 with a transmission, such as a gear box (not shown), that may be utilized to transfer power from the main turbine 128 to the main fuel pump 124, the main oxidizer pump 126 and the main coolant pump 132. In yet additional embodiments, the main fuel and oxidizer pumps 124, 126 may be driven by separate turbines operated by the same fluid in parallel-flow or in series-flow configurations.

The water (i.e., steam) that exits the main turbine 128 may then be directed through the first channel 160 of the heat exchanger 134. Additionally, liquid oxidizer, such as a mixture of water and hydrogen peroxide, from the main oxidizer pump 126 may be directed through the second channel 178 of the heat exchanger 134. The first and second channels 160, 178 of the heat exchanger 134 may be sized and configured to facilitate the transfer of heat from the steam entering the first channel 160 from the main turbine 128 to the liquid oxidizer entering the second channel 178 from the main oxidizer pump 126. For example, the heat exchanger 134 may be configured as one or more of a counter-flow heat exchanger, a shell and tube heat exchanger, a plate heat exchanger, and a plate fin heat exchanger. Within the first channel 160 of the heat exchanger 134, the steam from the main turbine 128 may be cooled to a temperature and pressure near a phase-transition temperature and pressure. The cooled steam exiting the first channel 160 of the heat exchanger 134 may then be directed into the second inlet 142 of the mixing chamber 138. Meanwhile, the liquid oxidizer exiting the second channel 178 of the heat exchanger 134 may be directed into the injector 114 of the combustor assembly 112. As the cooled steam enters the mixing chamber 138 it may be cooled further and condense to a liquid.

The oxidizer reservoir 122 may be a vessel structured to hold a quantity of liquid oxidizer. For example, liquid hydrogen peroxide may be stored in the oxidizer reservoir 122, and may be utilized as the oxidizer. Optionally, the coolant reservoir 122 may be pressurized, such as by a pressurized gas. The hydrogen peroxide may be maintained in a liquid phase as it is directed from the oxidizer reservoir 122 into the first inlet 140 of the mixing chamber 138.

The mixing chamber 138 may be configured similarly to the mixing chamber 34 described with reference to FIG. 2.

The mixing chamber 138 may comprise a porous structure separating a first chamber from the mixing chamber 138. For example, the mixing chamber 138 may be generally configured as a perforated tube positioned within an outer housing. The first chamber may be a generally annular chamber defined by an outer wall of the perforated tube and an inner wall of the outer housing. The first inlet 140 may be configured to direct the liquid hydrogen peroxide into the mixing chamber 138 from the oxidizer reservoir 122 through an opening at an end of the perforated tube. The second inlet 142 may be configured to direct liquid water from the first channel 160 of the heat exchanger 134 into the mixing chamber 138 through a perforated wall of the perforated tube. In view of this arrangement, water that is directed from the heat exchanger 134, which may be relatively warm in comparison to the liquid hydrogen peroxide from the fuel reservoir 122, may be well mixed with the liquid hydrogen peroxide prior to exiting the mixing chamber 138 and this may prevent gas pockets from forming within the mixing chamber 138 and may prevent cavitation within the main oxidizer pump 126.

The fuel reservoir 120 may comprise a vessel for holding a quantity of liquid fuel. For example, liquid hydrogen or a liquid hydrocarbon may be stored in the fuel reservoir 120, and may be utilized as the fuel. The fuel may be maintained in a liquid phase as it is directed from the oxidizer reservoir 122 into the first inlet 140 of the mixing chamber 138.

An oxidizer, such as hydrogen peroxide, and a coolant, such as water, may be mixed together in the mixing chamber 138, directed through the main oxidizer pump 126, directed through the second channel 178 of the heat exchanger 134 and then directed into the injector 114 of the combustor assembly 112. Additionally, a fuel, such as one or more of hydrogen and a hydrocarbon, may also be directed into the injector 114 of the combustor assembly 112. The oxidizer and coolant mixture and the fuel may then be directed from the injector 114 into the combustion chamber 116 where the oxidizer and the fuel may combust. Although the coolant may not react with the oxidizer and fuel during the combustion process, the coolant may become super-heated and may be directed out of the nozzle 118 as a propellant along with the propellant gases formed by the combustion of the oxidizer and the fuel to generate thrust.

In one example of the operation of an embodiment of the rocket engine assembly 110, a first reactant fluid, such as an oxidizer (i.e., liquid hydrogen peroxide), a second reactant fluid, such as a fuel (i.e., liquid hydrocarbon, such as RP-1), and a coolant fluid, such as purified water, are simultaneously directed into the injector 114 to be mixed. The first reactant fluid and the second reactant fluid are then combusted in the combustion chamber 116 and then the resulting combustion gases, as well as vaporized coolant fluid, are ejected through the nozzle 118 of the combustor assembly 112.

The coolant fluid is directed from the coolant reservoir 130 into the main coolant pump 132 through the fluid conduit 146. Upon exiting the main coolant pump 132 the coolant fluid is directed through the fluid conduit 150 into the combustor jacket 136 by pressure provided by the main coolant pump 132. Heat is then transferred into the coolant fluid by the combustor assembly 112 as the coolant fluid flows through the combustor jacket 136. The heated coolant fluid is then directed through the main turbine 128 to drive the main turbine 128 and power the main fuel pump 124, the main oxidizer pump 126 and the main coolant pump 132. The heated coolant fluid is then directed through the first channel 160 of the heat exchanger 134 where the heated coolant fluid is cooled. Upon exiting the first channel 160 of the heat exchanger 134, the coolant fluid is directed into the second inlet 142 of the mixing chamber 138.

Meanwhile, the first reactant fluid is directed from a first reactant reservoir (i.e., the oxidizer reservoir 122) into the first inlet 140 of the mixing chamber 138 through the fluid conduit 166. The first reactant fluid and the coolant fluid are then combined in the mixing chamber 138. The combined first reactant and coolant fluid is then fed into the main oxidizer pump 126 and upon exiting the main oxidizer pump 126 the combined first reactant and coolant fluid is directed into the second channel 178 of the heat exchanger 134 through the conduit 174. As the combined first reactant and coolant fluid is directed through the second channel 178 of the heat exchanger 134, heat is transferred from the coolant fluid flowing through the first channel 160 of the heat exchanger 134 into the combined first reactant and coolant fluid. The combined first reactant and coolant fluid is then directed out of the heat exchanger 134 and into the injector 114 of the combustor assembly 112 through the fluid conduit 182.

As the combined first reactant and coolant fluid is pumped by the main oxidizer pump 126 to provide the first reactant fluid and the coolant fluid to the injector 114 of the combustor assembly 112. The second reactant fluid is directed from a second reactant fluid reservoir (i.e., the fuel reservoir 120) into the inlet 184 of the main fuel pump 124 through the fluid conduit 186. The second reactant fluid is then fed through the main fuel pump 124 and exits the outlet 188 of the main fuel pump 124 where the second reactant fluid is directed into the injector 114 of the combustor assembly 112 through the fluid conduit 190.

In view of the foregoing, rocket engine assemblies according to the present invention may not require a gas generator (i.e., a pre-burner) during normal operation. Optionally, in some embodiments, a gas generator may be included and used only for start-up procedures. However, in some embodiments a gas generator may not be required for start-up procedures, as the rocket engine assembly may be started using bootstrap system power, such as from pressurized reactants.

In order to simplify engine configuration and to increase reliability during transient operation, both embodiments (shown in FIG. 1 and FIG. 3) may be configured to operate temporarily in an open-cycle mode during start-up. Thus, the embodiment described with reference to FIG. 1 may be configured so that both fuel and oxidizer may start flowing under the pressure provided within the reservoirs 20 and 22 after the opening of the valves 50, 82, and 96. To facilitate this initial flow through the main turbine 28, which may provide the initial turbomachinery spin-up, a pressure difference in the fuel circuit should be provided (i.e. between the fluid inlet of the main turbine 28 and the outlet 64 the main turbine 28). For example, the fluid conduit 74, which is coupled to the second inlet 72 of the mixing chamber 34, may include valves (not shown) that may temporarily close the fluid path to the second inlet 72 of the mixing chamber 34 and may provide an opening in the fluid conduit 74 that may vent fuel to the atmosphere. When the main turbine 28 and main pumps 24 and 26 reach a nominal rotational speed, the fluid path to the second inlet 72 of the mixing chamber 34 may be opened, the opening providing a vent from the fluid conduit 74 to the atmosphere may be closed, and the rocket engine assembly 10 will operate in normal closed-cycle mode. Similarly, the embodiment described with reference to FIG. 3 may include valves (not shown) that may temporarily provide an opening in the fluid conduit 174 that may vent coolant to the atmosphere and may temporarily close the fluid path to the second inlet 142 of the mixing chamber 138 during start-up.

Additionally, heat exchangers of embodiments of the present invention, such as the heat exchangers 30, 134 described with reference to FIGS. 1 and 2, may direct fluids through both the first and second channels 68, 78, 160, 178 of the heat exchangers 30, 134, respectively, that have the same or at least similar phase-transition pressures and temperatures. This may prevent icing in the heat exchanger, which may occur if fluids having dissimilar phase-transition pressures and temperatures are present in a heat exchanger, such as a cryogenic liquid fuel and water. Additionally, the fluids may not be reactive with one another, which may improve the safety of the rocket engine assembly.

Furthermore, it may be understood that rocket engine assemblies according to the present invention may provide a relatively high combustion chamber pressure and require a relatively low pump discharge pressure when compared to closed-cycle rocket engine assemblies utilizing a conventional expander cycle or other conventional closed-cycles. For example, the pump discharge-to-chamber pressure ratio for rocket engine assemblies according to the present invention may be about 1.5.

As may be understood by those of ordinary skill in the art, some components of the rocket engine assemblies described herein may be implemented differently than shown and described with reference to specific embodiments. For example, boost pumps may be utilized prior to the main pumps, fluid flows may be configured differently, pumps may be coupled to separate turbines, and valve arrangements may have different configurations.

Although this invention has been described with reference to particular embodiments, the invention is not limited to these described embodiments. Rather, the invention is limited only by the appended claims, which include within their scope all equivalent devices, systems and methods.

What is claimed is:

1. A closed-cycle rocket engine assembly comprising:
    a combustor assembly comprising:
        a combustion chamber; and
        a nozzle;
    a combustor jacket positioned and configured to facilitate a transfer of heat from the combustor assembly into a fluid within the combustor jacket;
    a turbine in communication with the combustor jacket to receive a fluid heated within the combustor jacket to drive the turbine;
    a first pump coupled to the turbine to be powered thereby;
    a mixing chamber comprising:
        a housing having a perforated tube extending therethrough;
        a first inlet of the housing for receiving the fluid from the turbine;
        a second inlet of the tube for receiving a reactant fluid from a first reactant reservoir; and
        an outlet for delivering a combined fluid from the turbine and the reactant fluid to the first pump; and
    wherein the first pump is configured to deliver at least a portion of the combined fluid from the mixing chamber into the combustion chamber of the combustor assembly.

2. The rocket engine assembly of claim 1, wherein the fluid within the combustor jacket comprises a coolant fluid, the rocket engine assembly further comprising:
    a second pump coupled to and powered by the turbine, the second pump configured to deliver the coolant fluid from a coolant reservoir to the combustor jacket;
    a fluid conduit to deliver the coolant fluid from the combustor jacket to the turbine;
    another fluid conduit to deliver the coolant fluid from the turbine to the mixing chamber; and
    a further fluid conduit to direct a combined coolant fluid and reactant fluid from the first pump into the combustion chamber of the combustor assembly.

3. The rocket engine assembly of claim 2, further comprising a heat exchanger comprising:
    a first channel configured to receive the coolant fluid from the turbine;
    a second channel configured to receive combined coolant fluid and the reactant fluid from the first pump; and
    wherein the first channel and the second channel are positioned and configured to facilitate the transfer of heat therebetween.

4. The rocket engine assembly of claim 2, further comprising a third pump coupled to and powered by the turbine, wherein the third pump is configured to deliver a second reactant fluid from a second reactant fluid reservoir into the combustion chamber of the combustor assembly.

5. The rocket engine assembly of claim 1, wherein the fluid within the combustor jacket comprises a reactant fluid and the first pump comprises an outlet conduit, the outlet conduit comprising:
    a first outlet to deliver the reactant fluid to the combustor jacket;
    a second outlet to deliver the reactant fluid to the combustion chamber of the combustor assembly; and
    a fluid conduit to direct the reactant fluid from the combustor jacket to the turbine.

6. The rocket engine assembly of claim 5, further comprising a heat exchanger comprising:
    a first channel configured to receive the reactant fluid from the turbine;
    a second channel configured to receive the reactant fluid from the second outlet of the first pump; and
    wherein the first channel and the second channel are positioned and configured to facilitate the transfer of heat therebetween.

7. The rocket engine assembly of claim 6, further comprising a second pump coupled to and powered by the turbine, wherein the second pump is configured to deliver a second reactant fluid from a second reactant fluid reservoir into the combustion chamber of the combustor assembly.

8. A method of operating a closed-cycle rocket engine assembly, the method comprising:
    driving a turbine with a fluid heated within a combustor jacket to operate a first pump coupled to the turbine and powered thereby;
    directing the fluid from the turbine into a mixing chamber via an inlet of a housing, wherein the housing comprises a perforated tube extending therethrough;
    directing a reactant fluid from a reactant reservoir into the mixing chamber via an inlet of the tube;
    directing a combined fluid from the turbine and the reactant fluid from the mixing chamber into the first pump; and
    delivering at least a portion of the combined fluid from the first pump into a combustion chamber of a combustor assembly further comprising a nozzle.

9. The method of claim 8, wherein directing the fluid from the turbine into a mixing chamber further comprises cooling the fluid from the turbine.

10. The method of claim 9, wherein cooling the fluid from the turbine comprises transferring heat from the fluid from the turbine to the at least a portion of the combined fluid.

11. The method of claim 8, further comprising directing the at least a portion of the combined fluid from the first pump into a heat exchanger prior to directing the at least a portion of the combined fluid into the combustion chamber.

12. The method of claim 8, wherein:
   driving a turbine with a fluid heated within a combustor jacket to operate a first pump coupled to the turbine and powered thereby comprises driving the turbine with fuel to operate the first pump coupled to the turbine;
   directing the fluid from the turbine into a mixing chamber comprises directing the fuel from the turbine into the mixing chamber;
   the reactant reservoir is a fuel reservoir and directing a reactant fluid from a reactant reservoir into the mixing chamber comprises directing additional fuel from the fuel reservoir into the mixing chamber to combine with the fuel from the turbine;
   directing a combined fluid from the turbine and the reactant fluid from the mixing chamber into the first pump comprises directing the fuel from the turbine combined with the additional fuel from the fuel reservoir in the mixing chamber into the first pump; and
   delivering at least a portion of the combined fluid from the first pump into the combustion chamber comprises delivering a first portion of the combined fuel from the first pump into the combustion chamber.

13. The method of claim 12, further comprising:
   delivering a remaining portion of the combined fuel from the first pump into the combustor jacket to heat the remaining portion of the combined fuel; and
   delivering the heated remaining portion of the combined fuel to the turbine to drive the turbine.

14. The method of claim 13, further comprising cooling the fuel directed from the turbine to the mixing chamber by transferring heat from the fuel to the first portion of the combined fuel as the first portion of the combined fuel is delivered from the first pump to the combustion chamber.

15. The method of claim 12, further comprising:
   driving the turbine with the fuel to operate an oxidizer pump coupled to the turbine; and
   delivering oxidizer from an oxidizer reservoir to the combustion chamber with the oxidizer pump.

16. The method of claim 8, wherein:
   the first pump is an oxidizer pump and driving a turbine with a fluid heated within a combustor jacket to operate a first pump coupled to the turbine and powered thereby comprises driving the turbine with a coolant to operate the oxidizer pump coupled to the turbine;
   directing the fluid from the turbine into a mixing chamber comprises directing the coolant from the turbine into the mixing chamber;
   the reactant reservoir is an oxidizer reservoir and directing a reactant fluid from a reactant reservoir into the mixing chamber comprises directing oxidizer into the mixing chamber to combine with the coolant from the turbine;
   directing a combined fluid comprising the fluid from the turbine and the reactant fluid from the mixing chamber into the oxidizer pump comprises directing the coolant from the turbine combined with the oxidizer from the oxidizer reservoir in the mixing chamber into the oxidizer pump; and
   delivering at least a portion of the combined fluid from the oxidizer pump into the combustion chamber comprises delivering all of the combined fluid from the oxidizer pump into the combustion chamber.

17. The method of claim 16, further comprising:
   driving the turbine with the coolant to operate a coolant pump coupled to the turbine; and
   delivering the coolant from a coolant reservoir to the turbine with the coolant pump.

18. The method of claim 17, further comprising transferring heat from the combustor assembly to the coolant as the coolant is delivered from the coolant reservoir to the turbine.

19. The method of claim 18, further comprising transferring heat from the coolant to the combined fluid as the coolant is directed from the turbine to the mixing chamber and the combined fluid is directed from the mixing chamber to the combustion chamber.

20. The method of claim 16, further comprising:
   driving the turbine with the coolant to operate a fuel pump coupled to the turbine; and
   delivering fuel from a fuel reservoir to the combustion chamber with the fuel pump.

* * * * *